United States Patent
Li

(10) Patent No.: US 11,137,923 B2
(45) Date of Patent: Oct. 5, 2021

(54) METHOD AND SYSTEM FOR DATA REDUCTION IN A STORAGE INFRASTRUCTURE TO SUPPORT A HIGH-RATION THIN-PROVISIONED SERVICE

(71) Applicant: Alibaba Group Holding Limited, Grand Cayman (KY)

(72) Inventor: Shu Li, Bothell, WA (US)

(73) Assignee: ALIBABA GROUP HOLDING LIMITED, Grand Cayman (KY)

(*) Notice: Subject to any disclaimer, the term of this patent is extended or adjusted under 35 U.S.C. 154(b) by 74 days.

(21) Appl. No.: 16/515,549

(22) Filed: Jul. 18, 2019

(65) Prior Publication Data
US 2021/0019066 A1     Jan. 21, 2021

(51) Int. Cl.
| | |
|---|---|
| *G06F 3/00* | (2006.01) |
| *G06F 3/06* | (2006.01) |
| *H04N 19/40* | (2014.01) |
| *G06F 9/50* | (2006.01) |

(52) U.S. Cl.
CPC ............ *G06F 3/0641* (2013.01); *G06F 3/067* (2013.01); *G06F 3/0626* (2013.01); *G06F 9/5016* (2013.01); *H04N 19/40* (2014.11); *G06F 2209/5011* (2013.01)

(58) Field of Classification Search
None
See application file for complete search history.

(56) References Cited

U.S. PATENT DOCUMENTS

| | | | | |
|---|---|---|---|---|
| 5,608,865 | A | * | 3/1997 | Midgely ............ G06F 11/2028 707/999.2 |
| 8,266,433 | B1 | | 9/2012 | Przykucki |
| 8,990,550 | B1 | | 3/2015 | Hushon |
| 9,830,467 | B1 | | 11/2017 | Harold |
| 2001/0023416 | A1 | | 9/2001 | Hosokawa |
| 2005/0071632 | A1 | | 3/2005 | Pauker |

(Continued)

FOREIGN PATENT DOCUMENTS

EP      3007478     4/2016

OTHER PUBLICATIONS

Baker et al. "Recommendation for Key Management—Part 1: General (Revision 3)", NIST Special Publication 800-57, Jul. 2012 (Year:2012).

(Continued)

*Primary Examiner* — Craig S Goldschmidt
(74) *Attorney, Agent, or Firm* — Shun Yao; Park, Vaughan, Fleming & Dowler LLP.

(57) ABSTRACT

One embodiment facilitates thin-provisioning in a distributed storage system. During operation, the system receives, by a first network switch, data to be written to a storage component of the first network switch. The system writes, by the first network switch, the data to the storage component. The system performs, by an integrated circuit residing on the first network switch, a data reduction process which reduces a size of the data to obtain reduced data. The system encodes, by the integrated circuit, the reduced data based on an encoding mechanism to obtain encoded data, wherein the encoded data can be written to non-volatile memory of one or more storage devices.

21 Claims, 11 Drawing Sheets

(56) References Cited

U.S. PATENT DOCUMENTS

| | | | |
|---|---|---|---|
| 2005/0141858 A1* | 6/2005 | Kumagai | H04N 19/59 |
| | | | 386/355 |
| 2008/0065881 A1 | 3/2008 | Dawson | |
| 2009/0019285 A1 | 1/2009 | Chen | |
| 2009/0125444 A1 | 5/2009 | Cochran | |
| 2010/0094950 A1* | 4/2010 | Zuckerman | H04L 67/1008 |
| | | | 709/213 |
| 2011/0238936 A1* | 9/2011 | Hayden | G06F 11/1076 |
| | | | 711/162 |
| 2012/0084570 A1 | 4/2012 | Kuzin | |
| 2012/0087500 A1 | 4/2012 | Ukita | |
| 2013/0170541 A1* | 7/2013 | Pace | H04N 19/149 |
| | | | 375/240.02 |
| 2013/0259233 A1 | 10/2013 | Baba | |
| 2015/0062904 A1 | 3/2015 | Sanga | |
| 2015/0134947 A1 | 5/2015 | Varcoe et al. | |
| 2015/0355837 A1* | 12/2015 | Bish | G06F 3/061 |
| | | | 711/114 |
| 2016/0013937 A1 | 1/2016 | Choi | |
| 2016/0149700 A1 | 5/2016 | Fu | |
| 2017/0104588 A1 | 4/2017 | Camenisch | |
| 2018/0351734 A1 | 12/2018 | Zhao | |
| 2019/0334727 A1* | 10/2019 | Kaufman | G06F 21/78 |

OTHER PUBLICATIONS

Sufyan T. Faraj, "A Novel Extension of SSL/TLS Based on Quantum Key Distribution", Computer and Communication Engineering, 2008. ICCCE 2008. International Conference on, IEEE, Piscataway, NJ, USA, May 16, 2008, pp. 919-922.

* cited by examiner

METHOD AND SYSTEM FOR DATA REDUCTION IN A STORAGE INFRASTRUCTURE TO SUPPORT A HIGH-RATION THIN-PROVISIONED SERVICE

BACKGROUND

Field

This disclosure is generally related to the field of data storage. More specifically, this disclosure is related to a method and system for data reduction in a storage infrastructure to support a high-ratio thin-provisioned service.

Related Art

The proliferation of the Internet and e-commerce continues to create a vast amount of digital content. Various distributed storage systems have been created to access and store such digital content. Network bandwidth and storage capacity of physical resources are two characteristics of distributed storage systems which can greatly impact performance, cost, and efficiency. One technology for handling physical resources is thin-provisioning, which involves a virtualization technology that provides the appearance of having more physical resources than are actually available. For example, physical memory in a computer may be thin-provisioned to allow tasks to run based on a form of address translation technology. Each task can perform or behave as if it has real memory allocated, but the sum of the allocated virtual memory assigned to the tasks generally exceeds the total amount of physical memory. Thin-provisioning can thus increase the revenue of a cloud service while maintaining a reasonable infrastructure cost. Thin-provisioning is generally directed to handling storage capacity.

However, as storage capacity is added to a distributed storage system, the physical bandwidth can still only support a certain number of users, e.g., to satisfy the requirements of a Service Level Agreement (SLA). For example, when a distributed storage system experiences a heavy load of simultaneous incoming traffic, some drives may become non-responsive due to a lack of sufficient bandwidth, even if sufficient storage capacity is available. This can result in an increased latency for certain applications/users. Thus, while thin-provisioning can be useful for handling or increasing storage capacity in a distributed storage system, maintaining or increasing the network bandwidth remains a challenge.

SUMMARY

One embodiment facilitates thin-provisioning in a distributed storage system. During operation, the system receives, by a first network switch, data to be written to a storage component of the first network switch. The system writes, by the first network switch, the data to the storage component. The system performs, by an integrated circuit residing on the first network switch, a data reduction process which reduces a size of the data to obtain reduced data. The system encodes, by the integrated circuit, the reduced data based on an encoding mechanism (such as an erasure code (EC)) to obtain encoded data, wherein the encoded data can be written to non-volatile memory of one or more storage devices.

In some embodiments, performing the data reduction process comprises: determining that a video format associated with the data is supported by the first network switch; performing, by the integrated circuit, a video transcoding process on the data to obtain transcoded data; compressing, by the integrated circuit, the transcoded data to obtain compressed data; and calculating, by the integrated circuit, a hash value of the compressed data.

In some embodiments, in response to determining, based on the calculated hash value, that a data block corresponding to the compressed data does not exist in the non-volatile memory of the storage devices, the system marks the data block and stores a mapping of the data block to a new key.

In some embodiments, in response to determining, based on the calculated hash value, that the data block corresponding to the compressed data already exists in the non-volatile memory of the storage devices, the system performs, by the integrated circuit, a de-duplication process by discarding the data block and storing a mapping of the data block to metadata associated with the data block.

In some embodiments, encoding the reduced data based on the encoding mechanism comprises encoding the compressed data based on an erasure code (EC) to obtain the encoded data, wherein the encoded data comprises an EC codeword.

In some embodiments, the system divides, by the integrated circuit, the EC codeword into a plurality of parts. The system transmits the EC-encoded data as the plurality of parts to a set of the one or more storage devices to be written to non-volatile memory of the set of the one or more storage devices.

In some embodiments, the system receives, by a respective storage device of the set, a first part of the divided EC codeword to be written to the non-volatile memory of the respective storage device. The system writes, by the respective storage device, the first part of the divided EC codeword to the non-volatile memory of the respective storage device.

In some embodiments, the data to be written to the storage component of the first network switch comprises first data. The system receives, by a second network switch, second data to be written to a storage component of the second network switch, wherein the second data is the same as the first data, and wherein the second network switch provides high availability for the first network switch. Performing the data reduction process and encoding the reduced data are in response to determining that the first data is successfully written to the storage component of the first network switch and that the second data is successfully written to the storage component of the second network switch.

In some embodiments, a distributed storage system comprises the first network switch, the second network switch, the one or more storage devices, a plurality of compute nodes, and a cold data pool device, wherein the cold data pool device comprises multiple non-volatile memory components.

In some embodiments, the system identifies, in the one or more storage devices, cold data which has been accessed less than a first predetermined threshold. The system transfers the cold data from a respective storage device to the first or second network switch based on a first predetermined time or time interval. The system transfers the cold data from the first or second network switch to the non-volatile memory components of the cold data pool device based on a second predetermined time or time interval. In response to determining that an amount of data stored in the non-volatile memory components of the cold data pool device exceeds a second predetermined threshold, the system: removes the cold data pool device from a physical rack associated with the distributed storage system; and inserts a new cold data pool device to the physical rack associated with the distributed storage system.

Another embodiment provides a network switch which facilitates thin-provisioning in a distributed storage system. The network switch comprises: a processor; a plurality of ports; a storage component (such as a persistent cache); a first integrated circuit; and a second integrated circuit. The first integrated circuit is configured to: receive data to be written to the persistent cache; and write the data to the storage component. The second integrated circuit is configured to: perform a data reduction process which reduces a size of the data to obtain reduced data; and encode the reduced data based on an encoding mechanism to obtain encoded data, wherein the encoded data can be written to non-volatile memory of one or more storage devices.

Another embodiment provides a computer system. The computer system comprises: one or more storage devices; a cold data pool device; and a first network switch and a second network switch. A network switch comprises: a processor; a plurality of ports; a storage component; a first integrated circuit; and a second integrated circuit. The first integrated circuit is configured to: receive data to be written to the storage component; and write the data to the storage component. The second integrated circuit is configured to: perform a data reduction process which reduces a size of the data to obtain reduced data; and encode the reduced data based on an encoding mechanism to obtain encoded data.

BRIEF DESCRIPTION OF THE FIGURES

In the figures, like reference numerals refer to the same figure elements.

DETAILED DESCRIPTION

Figure 1:
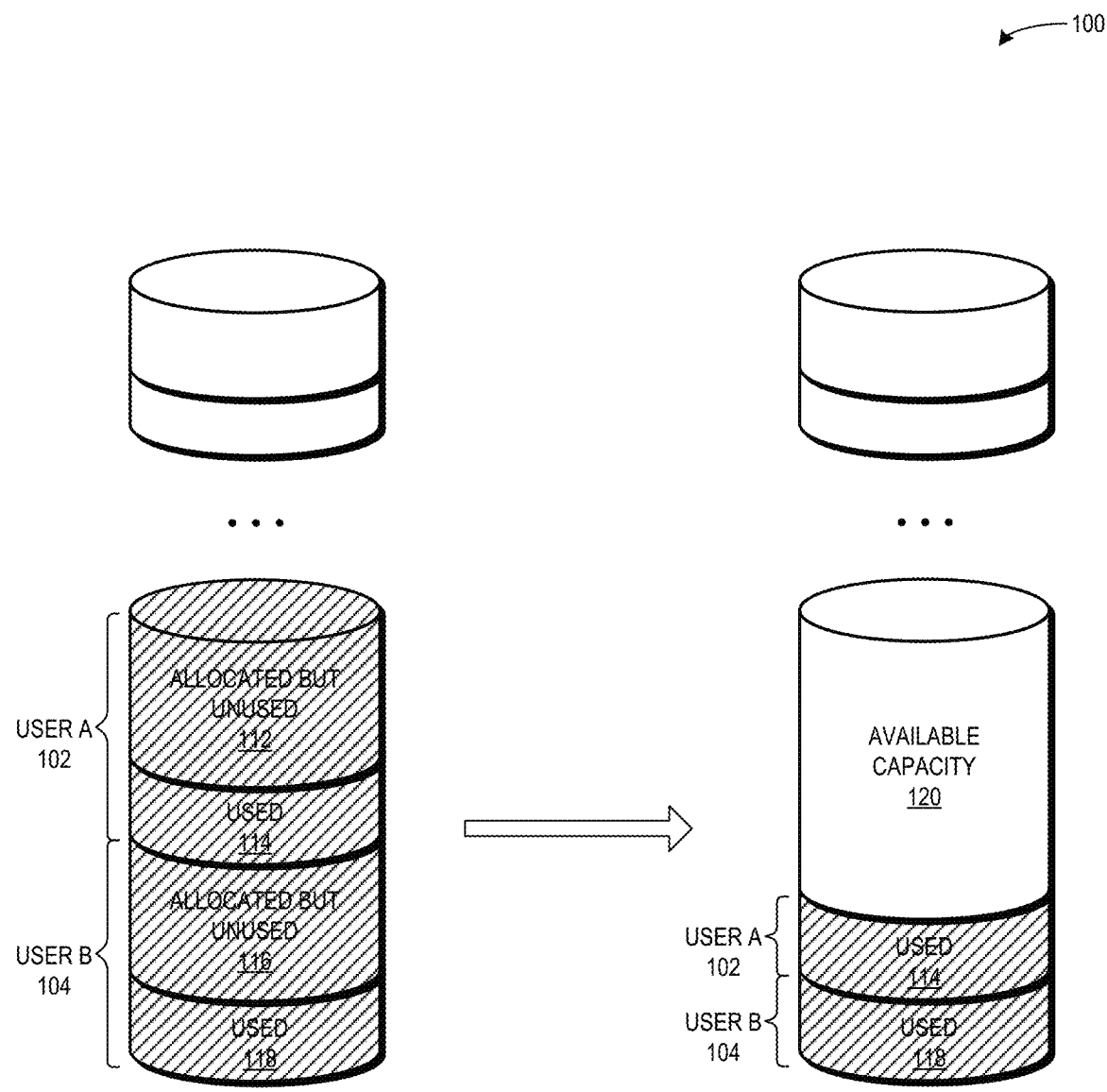
FIG. 1 illustrates an exemplary environment for facilitating thin-provisioning of capacity for multiple tenants, in accordance with the prior art.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the embodiments described herein are not limited to the embodiments shown, but are to be accorded the widest scope consistent with the principles and features disclosed herein.

Overview

The embodiments described herein solve the challenges of providing a thin-provisioned service and increasing the network bandwidth in a distributed storage system by placing a data reduction integrated circuit (IC) into a network switch. The network switch with the data reduction IC can be located in a data center rack with compute nodes, another network switch with a data reduction IC, storage nodes, and a cold data pool device.

As described above, network bandwidth and storage capacity are two characteristics of distributed storage systems which can greatly impact performance, cost, and efficiency. One technology for handling physical resources is thin-provisioning, which involves a virtualization technology that provides the appearance of having more physical resources than are actually available. For example, physical memory in a computer may be thin-provisioned to allow tasks to run based on a form of address translation technology. Each task can perform or behave as if it has real memory allocated, but the sum of the allocated virtual memory assigned to the tasks generally exceeds the total amount of physical memory. Thin-provisioning can thus increase the revenue of a cloud service while maintaining a reasonable infrastructure cost. Thin-provisioning is generally directed to handling storage capacity, and is described below in relation to FIG. 1.

However, as storage capacity is added to a distributed storage system, the physical bandwidth can still only support a certain number of users, e.g., to satisfy the requirements of a Service Level Agreement (SLA). For example, when a distributed storage system experiences a heavy load of simultaneous incoming traffic, some drives may become non-responsive due to a lack of sufficient bandwidth, even if sufficient storage capacity is available. This can result in an increased latency for certain applications/users. Thus, while thin-provisioning can be useful for handling or increasing storage capacity in a distributed storage system, maintaining or increasing the network bandwidth remains a challenge.

In a conventional distributed storage system, using high-capacity storage and a high-speed Ethernet network, a bottleneck can still remain at the storage node, e.g., when data is being transferred into the storage node, as described below in relation to FIG. 2. As an example, the throughput of a random write is significantly less than the throughput of a sequential write.

The embodiments described herein provide a system which reduces the amount of data transferred into a storage node. This data reduction can mitigate the burden of thin-provisioning on the bandwidth of a storage node or the throughput of a random write (e.g., in a solid state drive). The system provides this data reduction by placing a data reduction integrated circuit (IC) into a network switch, which receives data from compute nodes, performs data reduction to obtain a reduced amount of data, and transmits the reduced amount of data for storage in a storage node (e.g., a drive with storage capacity). An exemplary distributed storage system and a network switch which includes a data reduction IC are described below in relation to, respectively, FIGS. 3 and 4.

Furthermore, the network switches may be placed in close physical proximity with the storage nodes and a cold data pool device. For example, a single cabinet or rack in a data center can include: multiple compute nodes; a pair of network switches with respective data reduction ICs (where the pair can provide high availability for each other); multiple storage nodes; and a cold data pool device (as described below in relation to FIG. 6). Instead of consuming Ethernet network bandwidth to transfer cold data from the storage nodes to an archive service (as depicted below in relation to FIG. 2), the embodiments described herein can transfer cold data from the storage nodes to the cold data pool device via the network switch. These entities (i.e., the storage nodes, the network switch(es) with data reduction IC(s), and the cold data pool device) can be co-located in the same data center cabinet or rack (as depicted below in relation to FIG. 6). When the cold data pool device reaches a predetermined threshold, the cold data pool device can simply be removed from the rack or cabinet, and be replaced with a new cold data pool device. This eliminates the consumption of network resources, and can reduce the amount of overall network bandwidth consumed by transferring cold data (as in the prior art).

Thus, by placing a data reduction IC in a network switch, and co-locating the network switch, the compute nodes, the storage nodes, and the cold data pool device, the embodiments described herein can provide a high-ratio thin-provisioned service which increases the overall efficiency and performance of a distributed storage system. This can result in an increased Quality of Service (QoS), and can also result in a more modular and scalable deployment of a high-ratio thin-provisioned service in a distributed storage system, which can further result in a reduced total cost of operation (TCO).

A "storage server" or a "storage node" refers to a computing device which can include multiple storage drives. A distributed storage system can include multiple storage servers.

A "compute node" refers to a node which may act as a client device in a distributed storage system, e.g., a node that receives I/O requests and may perform some computational operations on data associated with an I/O request.

A "storage drive" refers to a device which includes storage capacity which is a persistent, non-volatile memory, e.g., a solid state drive (SSD), a hard disk drive (HDD), a shingled magnetic recording (SMR) HDD, etc.

A "cold data pool," "a cold data pool device," or a "cold data pool box" refers to a computing device which is coupled to a network switch, and can include a plurality of storage drives. In the embodiments described herein, a distributed storage system can identify "cold" data stored in a storage node and move the cold data from the storage node to the cold data pool, as described below in relation to FIG. 6.

A "network switch with data reduction" or a "network switch with a data reduction integrated circuit (IC)" refers to a switch which includes a central processing unit (CPU), a storage component (such as a persistent cache), a data reduction IC, a switch IC, and Ethernet ports. An exemplary network switch with a data reduction IC is described below in relation to FIG. 4.

Exemplary Environment for Thin-Provisioning of Capacity in the Prior Art; and Exemplary Environment for Facilitating Thin-Provisioning in a Distributed Storage System in the Prior Art FIG. 1 illustrates an exemplary environment 100 for facilitating thin-provisioning of capacity for multiple tenants, in accordance with the prior art. In a thin-provisioned environment, a certain amount of space (or virtual memory) can be allocated to each user (or tenant), where the sum of the allocated space exceeds the total amount of physical memory. Because each user may not be using all of his respectively allocated space at any given time, the system can allocate more space than is actually used, which can result in some amount of available capacity. However, this available capacity may only exist when all users are not using their respectively allocated capacity at the same time.

A storage device or storage drive can include capacity which has been allocated among multiple users or tenants. For example, in the storage drive of environment 100, the system can allocate to a user A 102 a certain portion of the capacity of the storage drive. The certain portion can include a used portion 114 and an allocated but unused portion 112. Similarly, the system can allocate to a user B 104 a certain portion of the capacity of the storage drive, and that certain portion can include a used portion 118 and an allocated but unused portion 116. All the allocated portions (including both the allocated but unused portions and the used portions) are indicated with right-slanting diagonal lines.

As a result, the storage device has an available capacity 120. The portions used by User A and User B (e.g., used portions 114 and 118) are indicated with right-slanting diagonal lines, while available capacity 120 is indicated with no shading. However, the risk of "overflow" may exist if the incoming traffic is too high, e.g., if all the users or tenants of the storage device attempt to use their respectively allocated capacity at the same time. During such an overflow scenario, either the storage capacity or the system bandwidth may be fully occupied or utilized, such that a non-responsive drive cannot respond to a client request, which can result in a long latency for some users. This can affect any ongoing service level agreements (SLAs) or Quality of Service (QoS) requirements. Furthermore, the overflow scenario can result in a less efficient distributed storage system.

Figure 2:
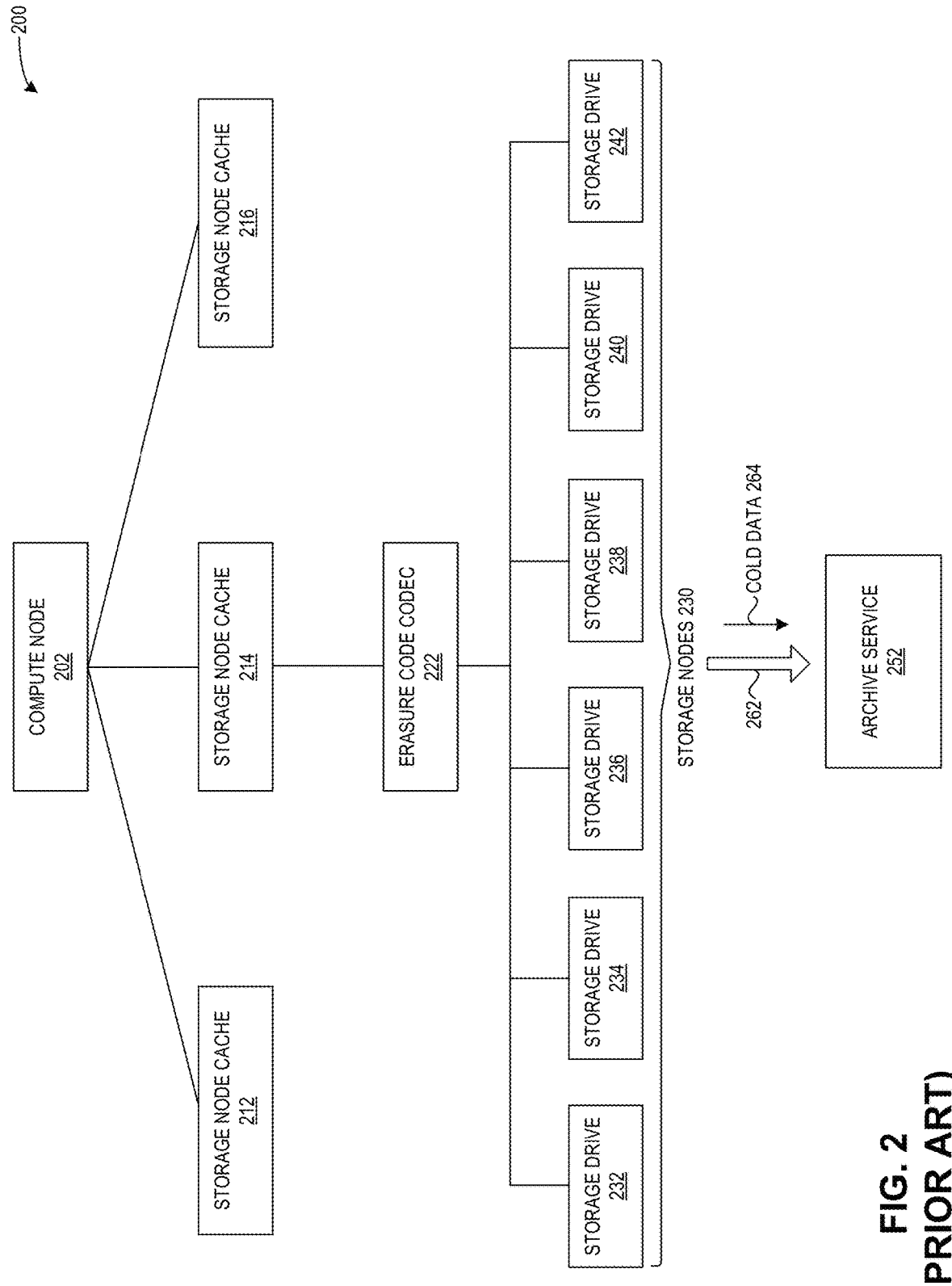
FIG. 2 illustrates an exemplary environment for facilitating thin-provisioning in a distributed storage system, in accordance with the prior art.

FIG. 2 illustrates an exemplary environment 200 for facilitating thin-provisioning in a distributed storage system, in accordance with the prior art. Environment 200 can include: a compute node 202; three storage node caches 212, 214, and 216; an erasure code codec 222; a plurality of storage nodes 230 (e.g., storage drives 232-242, which each can be a high-capacity storage drive); and an archive service 252.

During operation, compute node 202 can receive an I/O request to read, write, or otherwise access data. For example, in handling a write request, compute node 202 can send the data to be written to each of the three storage node caches 212, 214, and 216 (e.g., to a persistent cache of 212, 214, and 216). Subsequently, the I/O request (in this instance, the write request) can be committed with an acknowledge back to compute node 202. In the meantime, in the background (e.g., asynchronously), the system can read the data out from storage node caches 212, 214, and 216, and erasure code codec 222 can encode the data based on an erasure code (EC) to obtain EC-encoded data which is an EC codeword. The system can split the EC codeword into multiple pieces or parts, and can further distribute the pieces or parts by spreading them across the plurality of storage nodes 230.

The system can also sort the data stored in each storage drive based on a frequency of access, and determine a level of the "hotness" or the "coldness" of the data (e.g., a classification). Subsequently, the system can send the identified cold data to an archive service. For example, the system can identify cold data 264 of storage node 230, and send cold data 264 to an archive service 252. By using the abundant storage capacity of storage nodes 230 in environment 200, the system can efficiently perform both the classification of the data as cold data and any swapping of capacity as needed.

However, in a thin-provisioned environment, the resources include not only the capacity of the storage drives, but also the bandwidth of the logical drives. A high amount of user traffic can result in fully occupying or utilizing the bandwidth of the physical drives (e.g., the storage node caches 212, 214, and 216). Thus, an overwhelmed bandwidth on a physical storage drive can cause a user's I/O request to hang or suffer from a very long latency, even when there is sufficient capacity in the storage drive itself. That is, a storage drive with sufficient storage capacity can still become non-responsive to a user's commands in a thin-provisioned environment when the bandwidth of the storage drive is fully utilized (e.g., high amount of user traffic).

Figure 3:
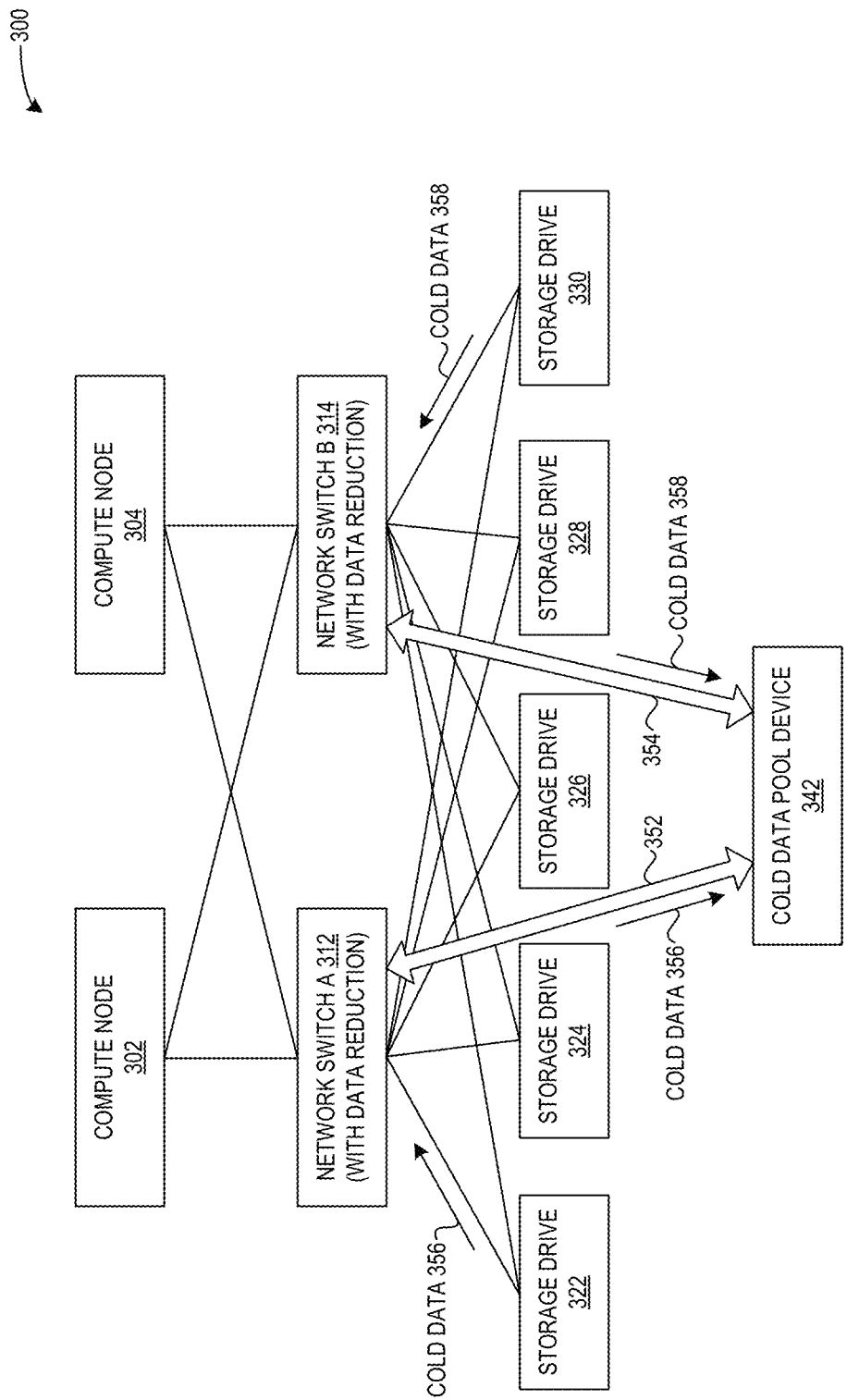
FIG. 3 illustrates an exemplary environment for facilitating thin-provisioning in a distributed storage system, including a network switch with a data reduction IC, in accordance with an embodiment of the present application.

Exemplary Environment for Facilitating Thin-Provisioning in a Distributed Storage System, Including a Network Switch with a Data Reduction IC FIG. 3 illustrates an exemplary environment 300 for facilitating thin-provisioning in a distributed storage system, including a network switch with a data reduction IC, in accordance with an embodiment of the present application. Environment 300 can include: a compute node 302 and a compute node 304; a network switch A 312 (with a data reduction IC) and a network switch B 314 (with a data reduction IC); storage drives 322-330; and a cold data pool device 342.

Compute nodes can receive data associated with an I/O request (such as data to be written to a non-volatile memory of the distributed storage system, or data to be written initially to a storage component of a network switch). The compute nodes can send this data to a pair of network switches, instead of to storage node caches (as depicted above in relation to FIG. 2A). The pair of network switches can be used to provide high availability for each other. Each network switch can include a storage component (such as a persistent cache) and a data reduction IC. The network switch, via its data reduction IC, can: perform a data reduction process on the data stored in its persistent cache; encode the reduced data based on an erasure code to obtained EC-encoded data; and transmit that EC-encoded data to the storage drives to be written in the non-volatile memory of the storage drives.

For example, during operation, compute node 302 (or 304) can receive an I/O request to read, write, or otherwise access data. In handling a write request, compute node 302 can send the data to both network switch A 312 and network switch B 314. Each of these network switches can write the data to its persistent cache, and immediately send back an acknowledgement to compute node 302 (or 304) of a successful write. Once the system has determined that the data has been successfully written to the respective persistent caches of network switches A 312 and B 314, one of the network switches can initiate the data reduction process, as described below in relation to FIG. 4. This data reduction process can include video transcoding, compression, de-duplication, and erasure coding, to obtain EC-encoded data which has been reduced in size from an original size. The EC-encoded data can be an EC codeword.

The system can divide the EC codeword into a plurality of parts, and transmit the plurality of parts to a set of storage drives to be written to non-volatile memory of the storage drives. The system can use any known algorithm to determine the division of the EC codeword into the plurality of parts and to identify the set of storage drives to which the plurality of parts are to be transmitted or distributed. In some embodiments, the system can achieve a gain, as seen in comparing the three full copies of data written to storage node caches 212-216 of FIG. 2 with an approximate 0.7 or 0.8 copies written to storage drives 322-330 of FIG. 3.

Furthermore, the system can sort or analyze the data stored in each storage drive based on a frequency of access, and determine a level or grade of the "hotness" or the "coldness" of the data (e.g., a classification). The cold data can be transmitted or transferred from each storage drive back to a network switch, and can subsequently be transmitted or transferred from the network switch directly to a cold data pool. The system can perform these transfers of the cold data (i.e., from a storage drive to a network switch, and from a network switch to the cold data pool) at a time when the utilization of the bandwidth of the network is moderate or low. In addition, these transfers do not need to include any further data reduction processing, as the data reduction processing is handled by and within each network switch (via its respective data reduction IC).

As an example, data which has been accessed less than a first predetermined threshold can be identified as cold data 356 in storage drive 322, and as cold data 358 in storage drive 330. The first predetermined threshold can be based on a frequency of access over a particular period of time, or a time interval since the most recent access, or any other time-related measurement related to access frequency. Furthermore, the system can sort the data at a periodic interval, which can be a predetermined time interval configured by a user of the system or a default time configured by the system.

The system can move, transmit, or transfer identified cold data 356 and 358 to, respectively, network switch A 312 and network switch B 314, and can subsequently move, transmit, or transfer cold data 356 and cold data 358 from the respective network switches to cold data pool device 342 (e.g., via, respectively, communications 352 and 354). These transfers can be performed based on or at a predetermined time or time interval. Furthermore, when the amount of data stored in cold data pool device 342 exceeds a second predetermined threshold, the cold data pool device 342 can be removed from a physical rack associated with the distributed storage system (e.g., from a cabinet in the data center), and a new cold data pool device can be added or inserted to the same physical rack associated with the distributed storage system. The physical rack can be a cabinet which houses the relevant entities, as described below in relation to FIG. 6.

The data stored in cold data pool device 342 can be moved to an archive service (not shown) at any time. For example, upon determining that the amount of data stored in cold data pool device 342 exceeds the second predetermined threshold, the system can send a notification message (not shown) to a user of the system, such as a system administrator. The notification message can indicate that the user is to remove cold data pool device 342 (as storing an amount of data which exceeds the second predetermined threshold) from the physical rack in a given data center, and to further replace cold data pool device 342 with a new cold data pool device. Thus, the cold data pool device may be physically moved and installed from one data center to another in order to reach the goal of moving Petabyte level or amounts of data within a short period of time.

Exemplary Network Switch with a Data Reduction IC

Figure 4:
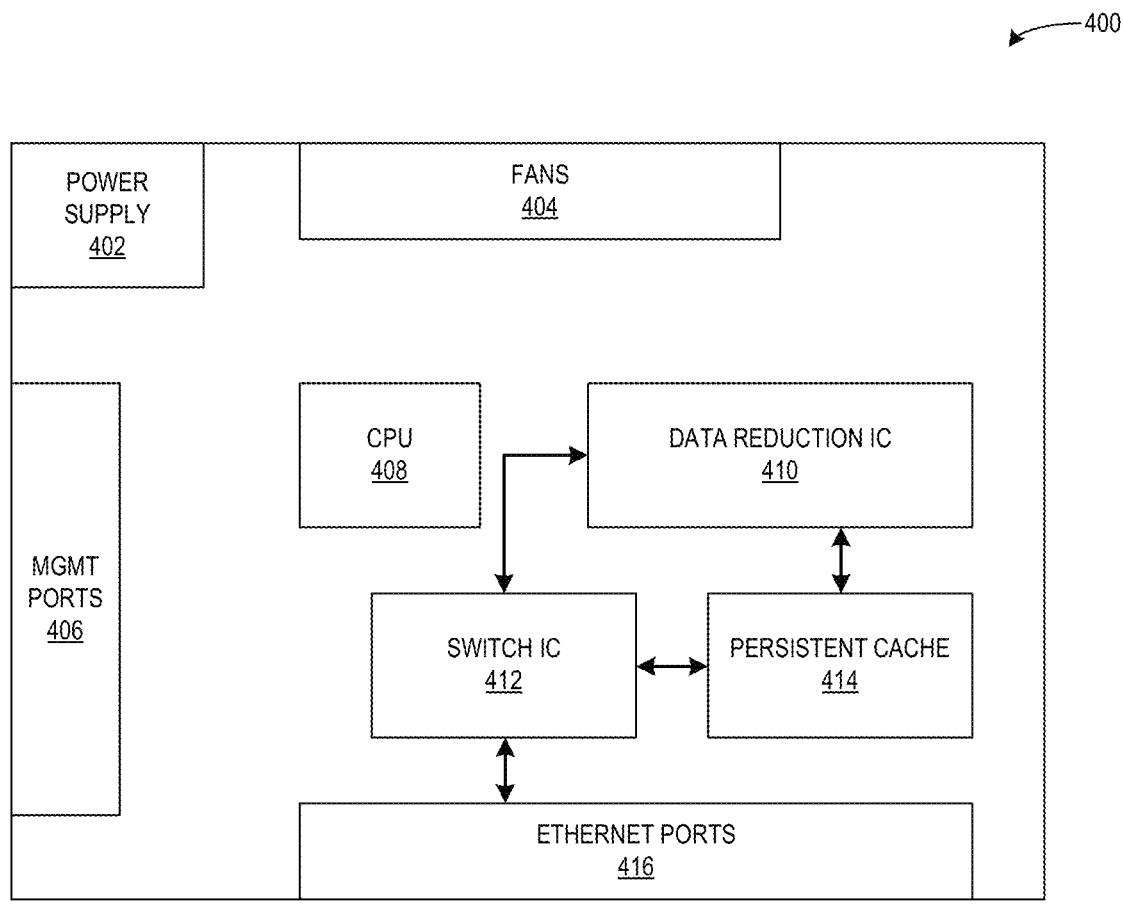
FIG. 4 illustrates an exemplary network switch with a data reduction IC, in accordance with an embodiment of the present application.

FIG. 4 illustrates an exemplary network switch 400 with a data reduction IC, in accordance with an embodiment of the present application. By implementing the data reduction functionality in an IC residing on the network switch, the system can achieve low latency and low power consumption. Network switch 400 can include: a power supply 402; fans 404; management ports 406; a CPU 408; a data reduction IC 410; a switch IC 412; a storage component or persistent cache 414; and Ethernet ports 416. Switch IC 412 can perform the main functions of an Ethernet switch, while CPU 408 can perform the management functions for an Ethernet switch. Persistent cache 414 can include a reasonable capacity, e.g., sufficient to hold incoming data from compute nodes and to serve as the buffer for data reduction processing and for performing the data write to the storage nodes. As described above, each data block can be sent from a compute node to two network switches for high availability.

Data reduction IC 410 can apply video transcoding (if necessary), compression, de-duplication, and erasure coding to reduce the amount of data (i.e., to reduce a size of the data). By reducing the amount of data which is to be transferred to a storage node, the system can reduce the utilization of the bandwidth of the overall distributed storage system, which can provide a high-ratio thin-provisioned service which increases the overall efficiency and performance of the distributed storage system.

Figure 5A:
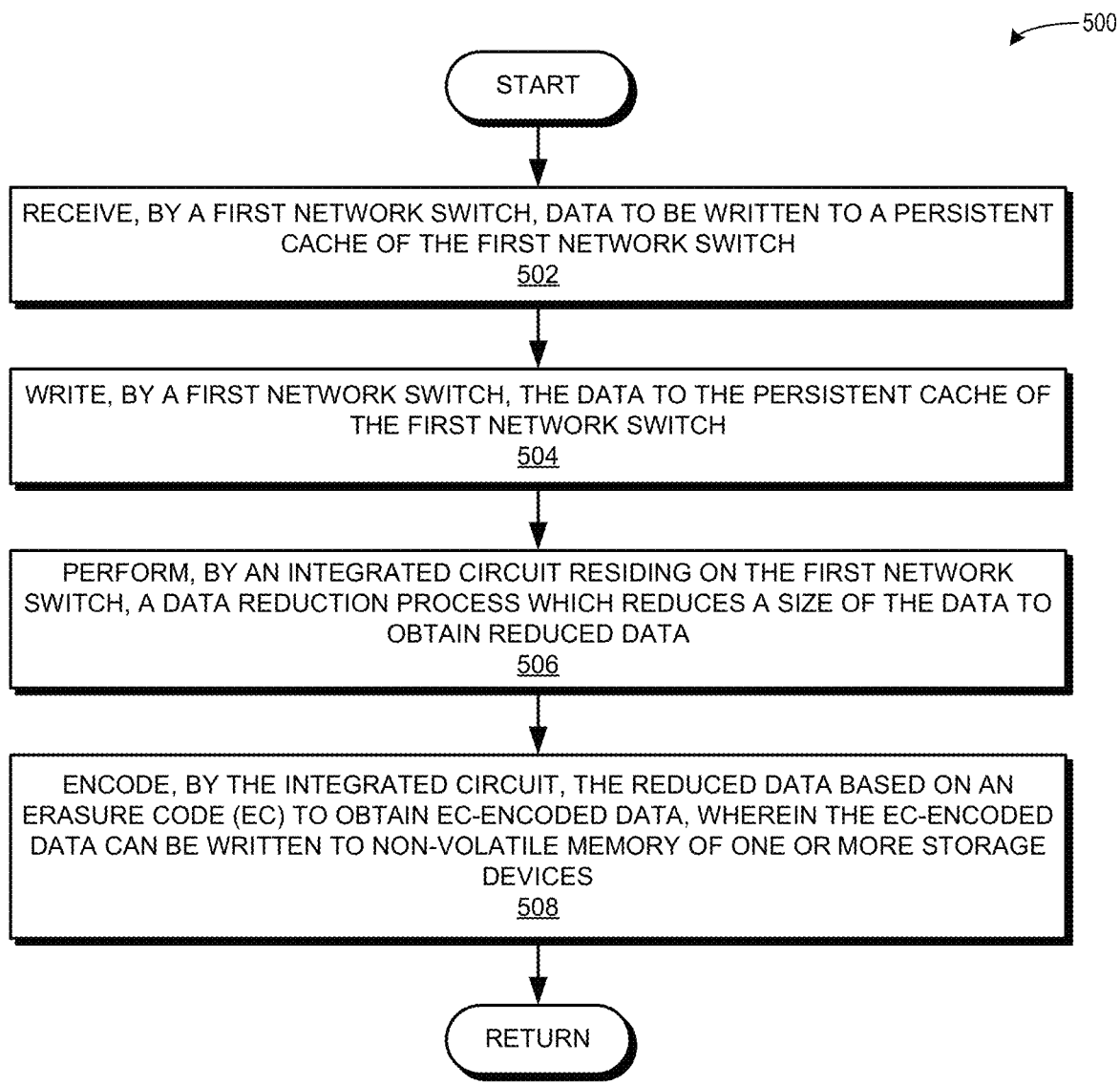
FIG. 5A illustrates an exemplary method for facilitating thin-provisioning and data placement in a distributed storage system, in accordance with an embodiment of the present application.

Exemplary Method for Facilitating Thin-Provisioning and Data Placement in a Distributed Storage System FIG. 5A illustrates an exemplary method 500 for facilitating thin-provisioning and data placement in a distributed storage system, in accordance with an embodiment of the present application. During operation, the system receives, by a first network switch, data to be written to a persistent cache of the first network switch (operation 502). The system writes, by the first network switch, the data to the persistent cache (operation 504). The system performs, by an integrated circuit residing on the first network switch, a data reduction process which reduces a size of the data to obtain reduced data (operation 506). The system encodes, by the integrated circuit, the reduced data based on an erasure code (EC) to obtain EC-encoded data, wherein the EC-encoded data can be written to non-volatile memory of one or more storage devices (operation 508).

Figure 5B:
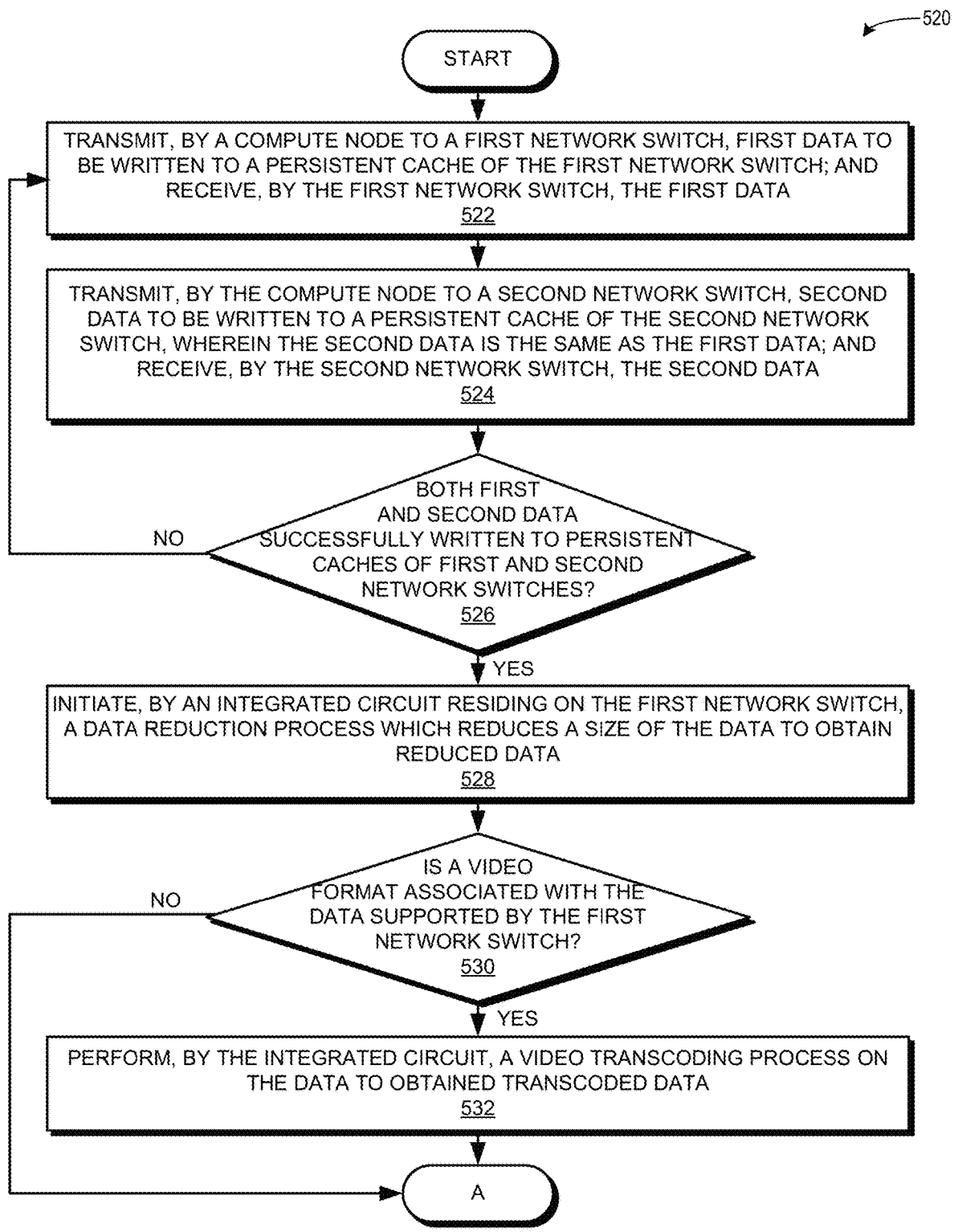
FIG. 5B illustrates an exemplary method for facilitating thin-provisioning and data placement in a distributed storage system, in accordance with an embodiment of the present application.

FIG. 5B illustrates an exemplary method 520 for facilitating thin-provisioning and data placement in a distributed storage system, in accordance with an embodiment of the present application. During operation, the system transmits, by a compute node to a first network switch, first data to be written to a persistent cache of the first network switch; and the system receives, by the first network switch, the first data (operation 522). The system transmits, by the compute node to a second network switch, second data to be written to a persistent cache of the second network switch; and the system receives, by the second network switch, the second data (operation 522).

If both the first and second data are not successfully written to the persistent caches of the first and second network switches (decision 526), the operation continues at operation 522 or 524. If both the first and second data are successfully written to the persistent caches of the first and second network switches (decision 526), the system initiates, by an integrated circuit residing on the first network switch, a data reduction process which reduces a size of the data to obtain reduced data (operation 528). Note that the first and second data are referred to simply as "the data" from operations 528 onwards in FIG. 5B. Furthermore, the system can determine to interleave the initiation of the data reduction process, and assign this task to either the first network switch or the second network switch, based on a load-balancing goal or algorithm. Thus, while these operations refer to actions of the first network switch, in some embodiments, the second network switch can perform the described operations.

Figure 5C:
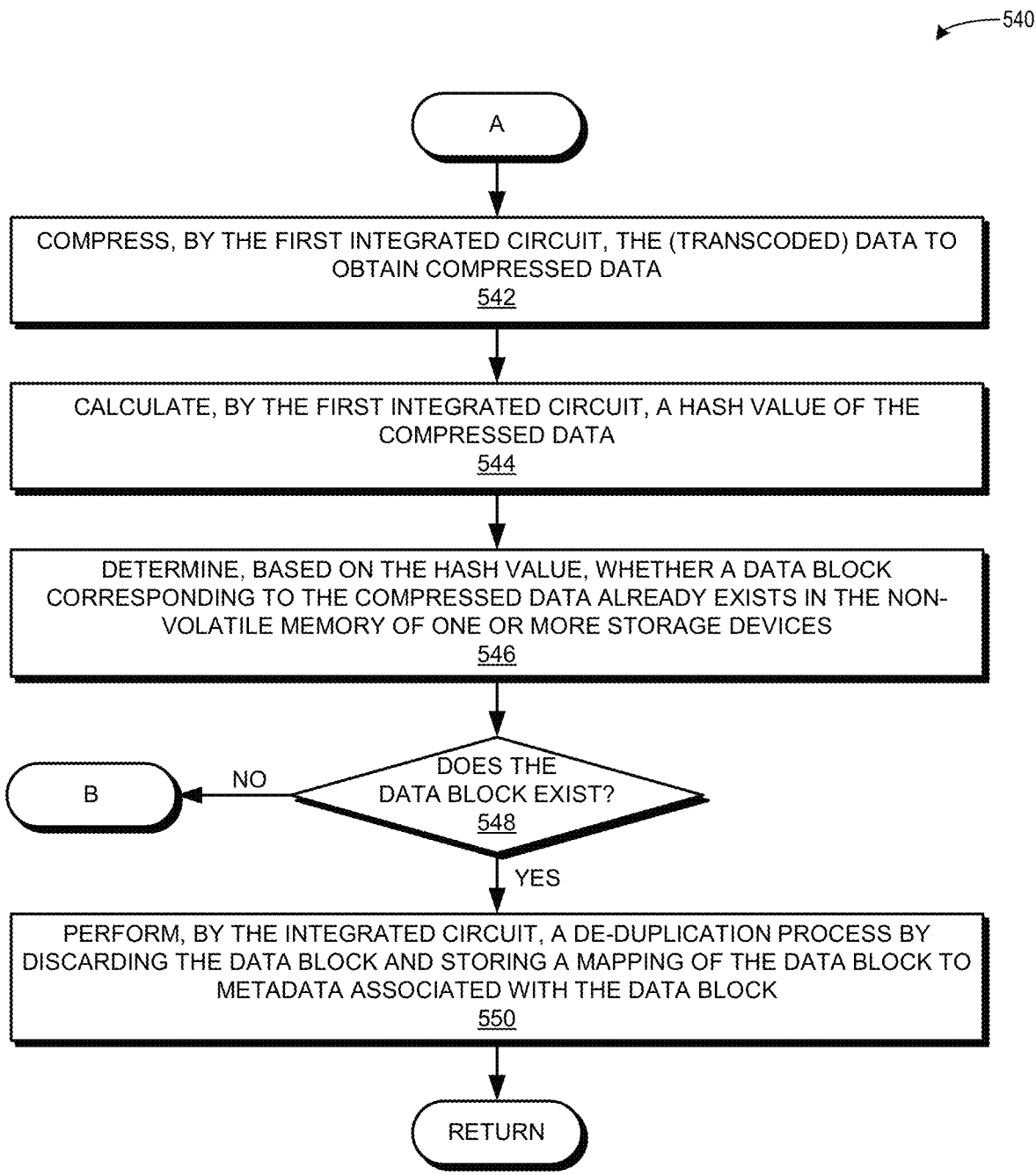
FIG. 5C illustrates an exemplary method for facilitating thin-provisioning and data placement in a distributed storage system, in accordance with an embodiment of the present application.

If a video format associated with the data is not supported by the first network switch (decision 530), the operation continues at Label A of FIG. 5C. If a video format associated with the data is supported by the first network switch (decision 530), the system performs, by the integrated circuit, a video transcoding process on the data to obtain transcoded data (operation 532). The operation continues at Label A of FIG. 5C.

FIG. 5C illustrates an exemplary method 540 for facilitating thin-provisioning and data placement in a distributed storage system, in accordance with an embodiment of the present application. The system compresses, by the integrated circuit, the (transcoded) data to obtain compressed data (operation 542). The data which is compressed may or may not be transcoded (depending on how Label A is reached after decision 530 of FIG. 5B. The system calculates, by the integrated circuit, a hash value of the compressed data (operation 544). The system determines, based on the hash value, whether a data block corresponding to the compressed data already exists in the non-volatile memory of one or more storage devices (operation 546). The storage devices can be associated with or part of a distributed system which includes: the compute node; the first network switch; the second network switch; and a cold data pool device. If the corresponding data block does not exist (decision 548), the operation continues at Label B of FIG. 5D. If the corresponding data block does exist (decision 548), the system performs, by the integrated circuit, a de-duplication process by discarding the data block and storing a mapping of the data block to metadata associated with the data block (operation 550), and the operation returns.

Figure 5D:
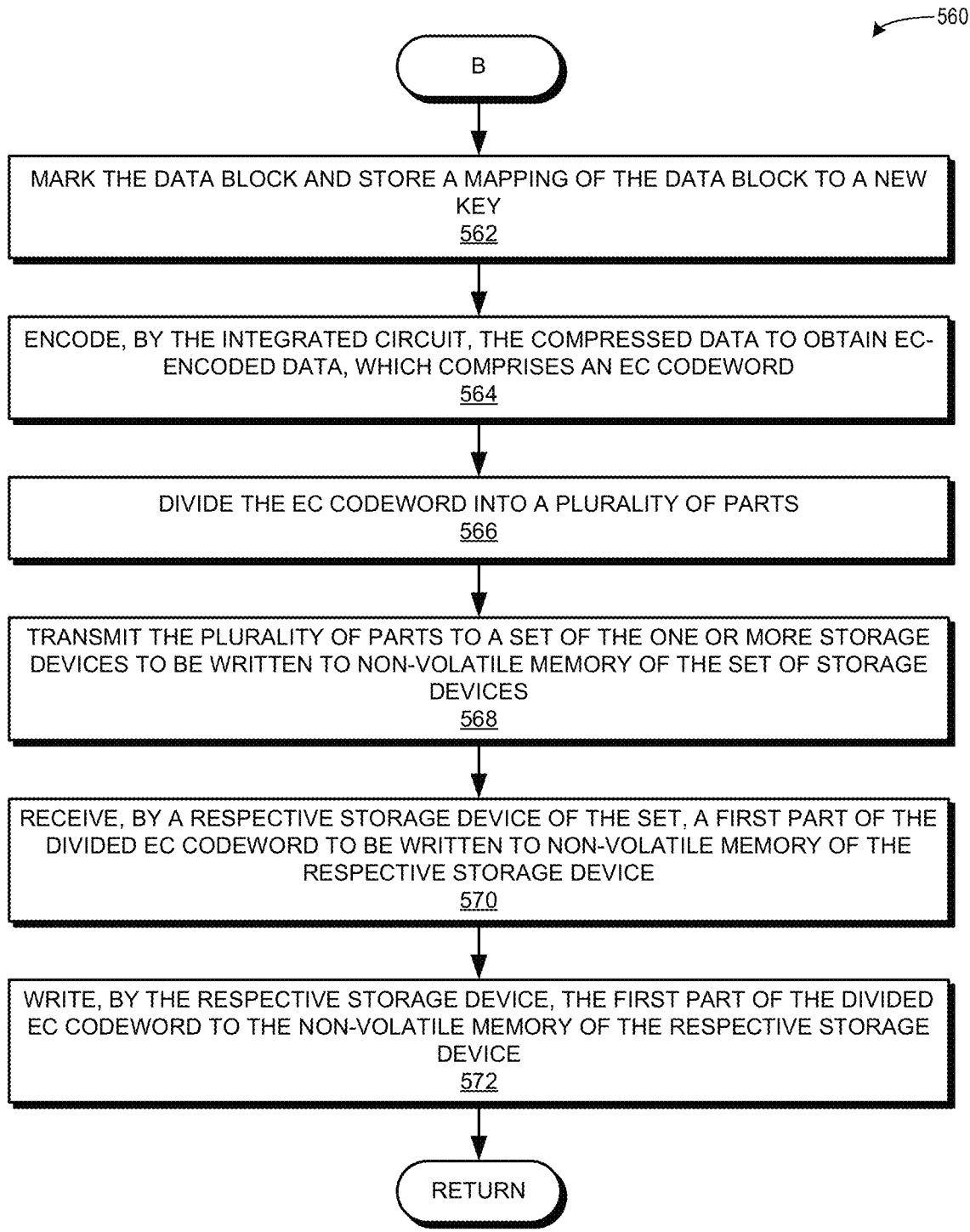
FIG. 5D illustrates an exemplary method for facilitating thin-provisioning and data placement in a distributed storage system, in accordance with an embodiment of the present application.

FIG. 5D illustrates an exemplary method 560 for facilitating thin-provisioning and data placement in a distributed storage system, in accordance with an embodiment of the present application. During operation, the system marks the data block and stores a mapping of the data block to a new key (operation 562). The system encodes, by the integrated circuit, the compressed data to obtain EC-encoded data, which comprises an EC codeword (operation 564). The system divides the EC codeword into a plurality of parts (operation 566). The system transmits the plurality of parts to a set of the one or more storage devices to be written to non-volatile memory of the set of storage devices (operation 568).

The system receives, by a respective storage device of the set, a first part of the divided EC codeword to be written to non-volatile memory of the respective storage device (operation 570). The system writes, by the respective storage device, the first part of the divided EC codeword to the non-volatile memory of the respective storage device (operation 572).

In FIGS. 5A-5D and in the embodiments described herein, the depiction of a persistent cache of a network switch is not limiting, and any storage component may be used. Similarly, the depiction of encoding the reduced data based on an erasure code (EC) is not limiting, and any encoding mechanism may be used.

Figure 6:
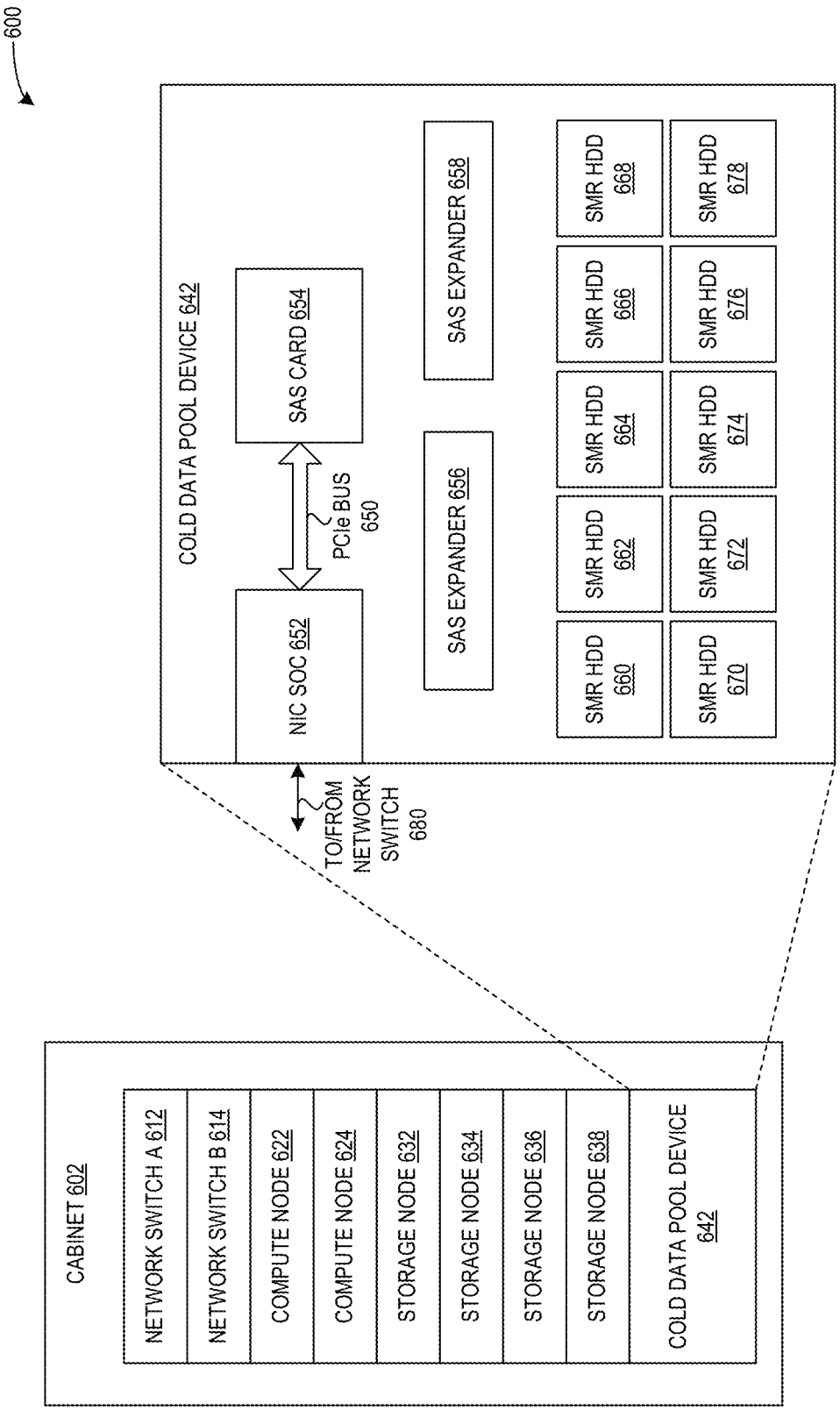
FIG. 6 illustrates an exemplary design for a cabinet or a rack in a data center, including a cold data pool device, in accordance with an embodiment of the present application.

Exemplary Design for a Data Center Cabinet or Rack, Including a Cold Data Pool Box FIG. 6 illustrates an exemplary design 600 for a cabinet or a rack in a data center, including a cold data pool device, in accordance with an embodiment of the present application. A cabinet 602 can be a rack in a data center and can be associated with a distributed storage system. Cabinet 602 can include: a pair of network switches (a network switch A 612 and a network switch B 614); compute nodes 622 and 624; storage nodes 632, 634, 636, and 638; and a cold data pool device 642. Cold data pool device 642 can include components for network communication and non-volatile memory components (e.g., SMR HDDs). Specifically, cold data pool device 642 can include: a network interface card (NIC) system on chip (SoC) 652 which is communicatively coupled via a Peripheral Component Interconnect Express (PCIe) bus 650 to a Serial Attached Small Computer System Interface (SCSI) (SAS) card 654; SAS expanders 656 and 658; and SMR HDDs 660-678.

NIC SoC 652 can handle communications to/from a network switch (via a communication 680). For example, when cold data is transferred from storage node 632 to network switch A 612, NIC SoC 652 can receive the cold data transferred from network switch A 612 to cold data pool device 642 (as described above in relation to FIG. 3).

Cold data pool device 642 is depicted as using SMR HDDs for its main non-volatile memory storage, but any other physical media can be used, particularly any low-cost media which can meet sufficiently meet the requirements of storing cold data or functioning as storage prior to storage in a more permanent type of archival service or system.

Exemplary Computer System and Apparatus

Figure 7:
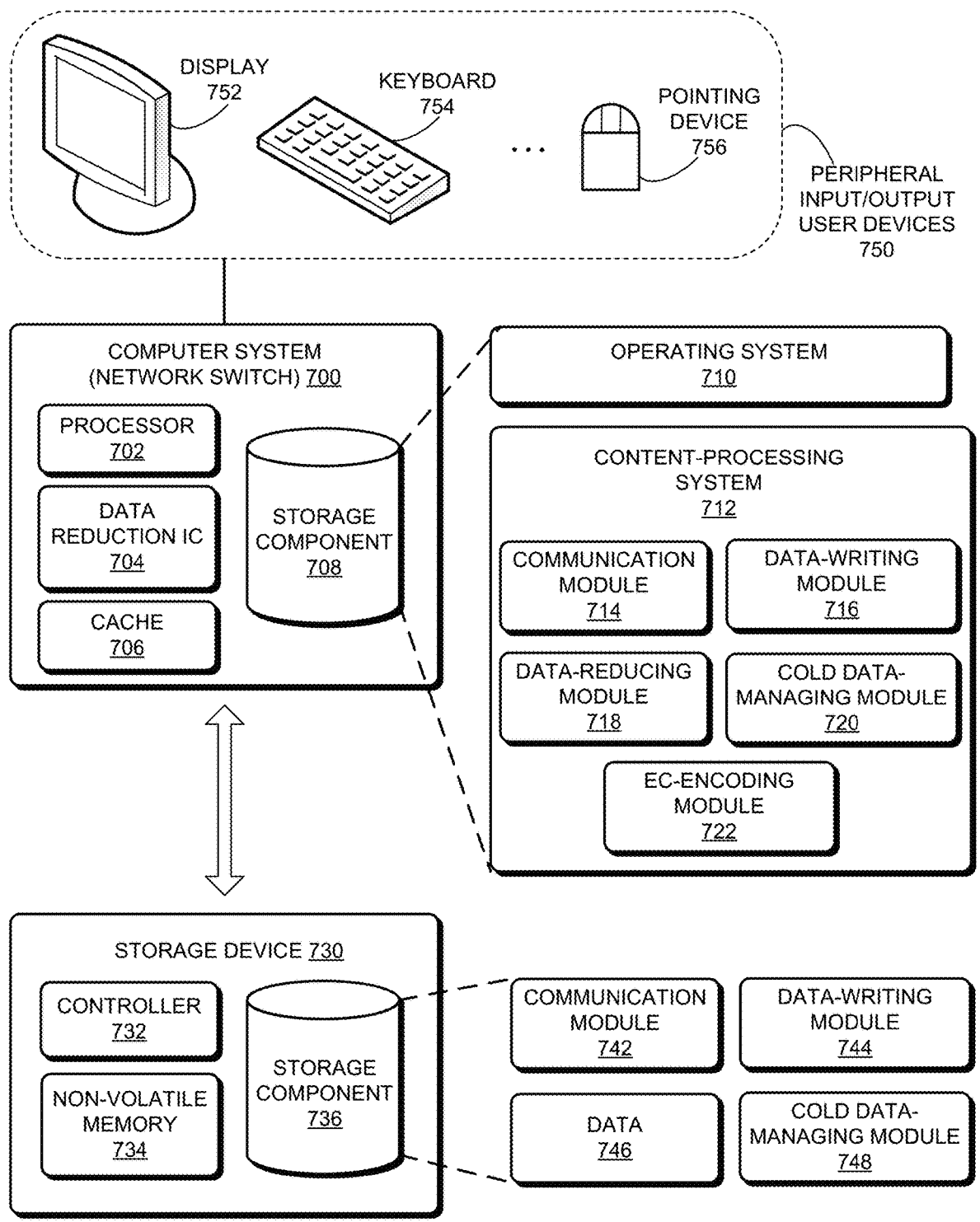
FIG. 7 illustrates an exemplary computer and storage device that facilitates thin-provisioning and data placement, in accordance with an embodiment of the present application.

FIG. 7 illustrates an exemplary computer system 700 that facilitates thin-provisioning and data placement, in accordance with an embodiment of the present application. Computer system 700 can be a network switch (e.g., "a first network switch") and can include a processor 702, a data reduction IC 704, a cache 706, and a storage component 708. Computer system 700 can correspond to network switch 400 of FIG. 4, and data reduction IC 704 can correspond to data reduction IC 410 of FIG. 4. Storage component 708 can include persistent storage, and can also comprise cache 706, which can correspond to persistent cache 414 of FIG. 4. Furthermore, computing device 700 can be coupled to peripheral input/output (I/O) user devices 750, e.g., a display device 752, a keyboard 754, and a pointing device 756. In some embodiments, computer system (network switch) 700 may communicate with compute nodes, to which peripheral I/O user devices 750 may also be coupled. Storage component 708 can store an operating system 710, a content-processing system 712, and various modules, which can be components configured to perform the operations disclosed herein. Furthermore, storage component 708 can be a non-transitory storage medium.

Content-processing system 712 (or storage component 708) can include instructions, which when executed by computing device 700, can cause computing device 700 to perform methods and/or processes described in this disclosure. Specifically, content-processing system 712 can include instructions for receiving and transmitting data packets, including data to be read or written, an input/output (I/O) request (e.g., a read request or a write request), and data associated with a read request, a write request, or an I/O request (communication module 714).

Content-processing system 712 can further include instructions for receiving, by a first network switch, data to be written to a persistent cache of the first network switch (communication module 714). Content-processing system 712 can include instructions for writing, by the first network switch, the data to the persistent cache (data-writing module 716). Content-processing system 712 can include instructions for performing, by an integrated circuit residing on the first network switch, a data reduction process which reduces a size of the data to obtain reduced data (data-reducing module 718). Content-processing system 712 can also include instructions for encoding, by the integrated circuit, the reduced data based on an erasure code (EC) to obtain EC-encoded data, wherein the EC-encoded data can be written to non-volatile memory of one or more storage devices (EC-encoding module 722).

Content-processing system 712 can include instructions for determining that a video format associated with the data is supported by the first network switch (data-reducing module 718). Content-processing system 712 can include instructions for performing, by the integrated circuit, a video transcoding process on the data to obtain transcoded data (data-reducing module 718). Content-processing system 712 can include instructions for compressing, by the integrated circuit, the transcoded data to obtain compressed data (data-reducing module 718). Content-processing system 712 can include instructions for calculating, by the integrated circuit, a hash value of the compressed data (data-reducing module 718).

Content-processing system 712 can include instructions for dividing, by the integrated circuit, the EC codeword into a plurality of parts (EC-encoding module 722). Content-processing system 712 can include instructions for transmitting the EC-encoded data as the plurality of parts to a set of the one or more storage devices to be written to non-volatile memory of the set of the one or more storage devices (EC-encoding module 722 and communication module 714).

Computer system 700 can communicate with a plurality of storage devices, such as a storage device 730. Storage device 730 can correspond to any of storage drives 322-330 of FIG. 3. Storage device 730 can include a controller 732, a non-volatile memory 734, and a storage component 736. The modules depicted as part of storage component 736 can also be associated with controller 732.

Storage component 736 can be a non-transitory storage medium, and can include instructions, which when executed by storage device 730, can cause storage device 730 to perform methods and/or processes described in this disclosure. Specifically, storage component 736 can include instructions for receiving, by a respective storage device of the set, a first part of the divided EC codeword to be written to the non-volatile memory of the respective storage device (communication module 742). Storage component 736 can also include instructions for writing, by the respective storage device, the first part of the divided EC codeword to the non-volatile memory of the respective storage device (data-writing module 744).

Storage component 736 can also include instructions for identifying, in the one or more storage devices, cold data which has been accessed less than a first predetermined threshold (cold data-managing module 748). Storage component 736 can also include instructions for transferring the cold data from a respective storage device to the first or second network switch based on a first predetermined time or time interval (communication module 742). Content-processing system 712 can include instructions for transferring the cold data from the first or second network switch to the non-volatile memory components of the cold data pool device based on a second predetermined time or time interval (communication module 714).

Cache 706 can store data associated with a read, write, or other input/output (I/O) request. Cache 706 can also store data that is reduced as part of the operations performed by data-reducing module 718 and/or data reduction IC 704.

Data 746 can be associated with storage component 736 or non-volatile memory 734. Data 746 can include any data that is required as input or generated as output by the methods and/or processes described in this disclosure. Specifically, data 746 can store at least: data; data associated with a read request, a write request, or an I/O request; reduced data; a size of data; a size of reduced data; encoded or decoded data; EC-encoded/decoded data; an EC codeword; an EC codeword divided into a plurality of parts; compressed or decompressed data; a video format; a video transcoding process; transcoded data; a hash value; a video format; a data structure; a data block; a key; a mapping of a data block to a key; a de-duplication process; metadata; a mapping of a data block to metadata; a first predetermined threshold; a second predetermined threshold; a first predetermined time or time interval; a second predetermined time or time interval; an indicator of cold data; an access frequency associated with data; an indicator of a network switch, a compute node, a storage device, or a cold data pool device; and an indicator of a physical rack or a cabinet.

Figure 8:
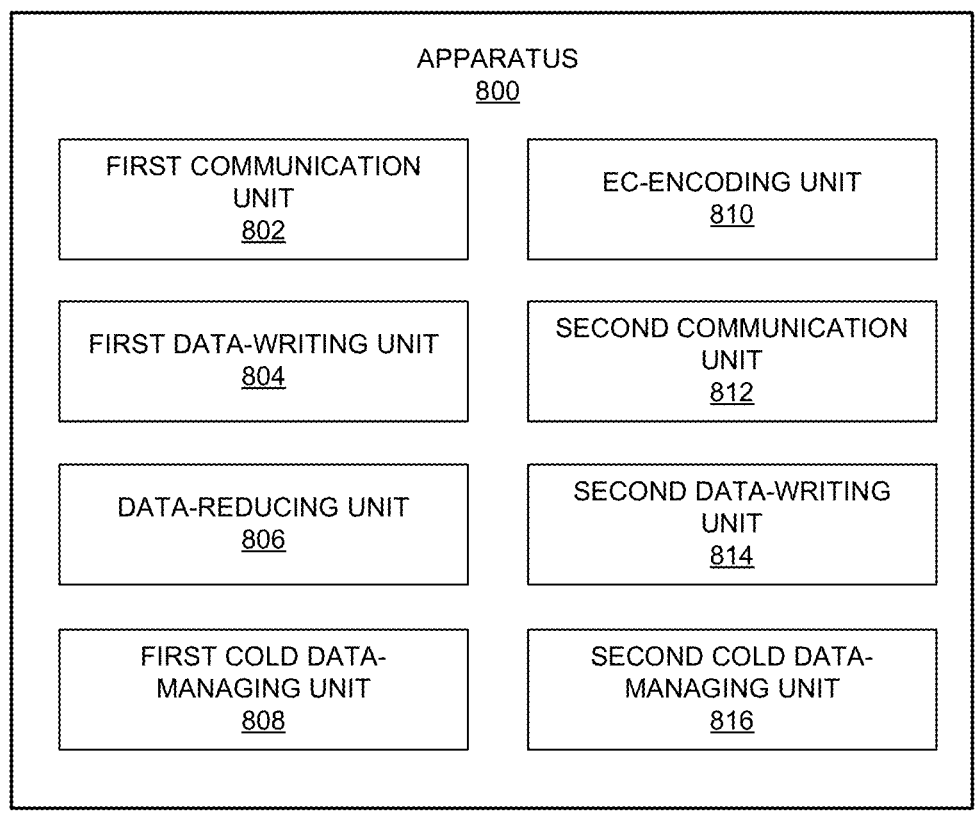
FIG. 8 illustrates an exemplary apparatus that facilitates thin-provisioning and data access, in accordance with an embodiment of the present application.

FIG. 8 illustrates an exemplary apparatus 800 that facilitates thin-provisioning and data access, in accordance with an embodiment of the present application. Apparatus 800 can comprise a plurality of units or apparatuses which may communicate with one another via a wired, wireless, quantum light, or electrical communication channel. Apparatus 800 may be realized using one or more integrated circuits, and may include fewer or more units or apparatuses than those shown in FIG. 8. Further, apparatus 800 may be integrated in a computer system, or realized as a separate device(s) which is/are capable of communicating with other computer systems and/or devices. Specifically, apparatus 800 can comprise units 802-816 which perform functions or operations similar to modules 714-722 and 742, 744, and 748 of FIG. 7, including: a first communication unit 802; a first data-writing unit 804; a data-reducing unit 806; a first cold data-managing unit 808; an EC-encoding unit 810; a second communication unit 812; a second data-writing unit 814; and a second cold data-managing unit 816.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing embodiments described herein have been presented for purposes of illustration and description only. They are not intended to be exhaustive or to limit the embodiments described herein to the forms disclosed. Accordingly, many modifications and variations will be apparent to practitioners skilled in the art. Additionally, the above disclosure is not intended to limit the embodiments described herein. The scope of the embodiments described herein is defined by the appended claims.

What is claimed is:

1. A computer-implemented method, comprising:
receiving, by a first network switch, data to be written to a storage component of the first network switch, wherein the first network switch comprises a processor, a plurality of Ethernet ports, and the storage component, and further comprises an intergrated circuit which resides on the first network switch;
writing, by the first network switch, the data to the storage component;
performing, by the integrated circuit residing on the first network switch, a data reduction process to obtain reduced data, wherein performing the data reduction process comprises;
transcoding the data responsive to determining that a video format associated with the data is supported by the first network switch;
compressing the data;
calculating a hash value of the compressed data;
performing a de-duplication process responsive to determining, based on the calculated hash value, that a data block corresponding to the compressed data exists in non-volatile memory of one or more storage devices; and
obtaining the reduced data; and
encoding, by the integrated circuit residing on the first network switch, the reduced data based on an erasure code (EC) to obtain EC-encoded data; and
writing the EC-encoded data to the non-volatile memory of the one or more storage devices.

2. The method of claim 1, wherein performing the data reduction process further comprises:
determining that the video format associated with the data is supported by the first network switch.

3. The method claim 1, further comprising:
in response to determining, based on the calculated hash value, that a data block corresponding to the compressed data does not exist in the non-volatile memory of the storage devices:
marking the data block and storing a mapping of the data block to a new key.

4. The method of claim 1,
wherein in response to determining, based on the calculated hash value, that the data block corresponding to the compressed data exists in the non-volatile memory of the storage devices:

performing the de-duplication process by discarding the data block and storing a mapping of the data block to metadata associated with the data block.

5. The method of claim 1, wherein the EC-encoded data comprises an EC codeword.

6. The method of claim 5, further comprising:
dividing, by the integrated circuit, the EC codeword into a plurality of parts; and
transmitting the EC-encoded data as the plurality of parts to a set of the one or more storage devices to be written to non-volatile memory of the set of the one or more storage devices.

7. The method of claim 6, further comprising:
receiving, by a respective storage device of the set, a first part of the divided EC codeword to be written to the non-volatile memory of the respective storage device; and
writing, by the respective storage device, the first part of the divided EC codeword to the non-volatile memory of the respective storage device.

8. The method of claim 1, wherein the data to be written to the storage component of the first network switch comprises first data, and wherein the method further comprises:
receiving, by a second network switch, second data to be written to a storage component of the second network switch, wherein the second data is the same as the first data, and wherein the second network switch provides high availability for the first network switch; and
wherein performing the data reduction process and encoding the reduced data are in response to determining that the first data is successfully written to the storage component of the first network switch and that the second data is successfully written to the storage component of the second network switch.

9. The method of claim 8, wherein a distributed storage system comprises the first network switch, the second network switch, the one or more storage devices, a plurality of compute nodes, and a cold data pool device, wherein the cold data pool device comprises multiple non-volatile memory components.

10. The method of claim 9, further comprising:
identifying, in the one or more storage devices, cold data which has been accessed less than a first predetermined threshold;
transferring the cold data from a respective storage device to the first or second network switch based on a first predetermined time or time interval;
transferring the cold data from the first or second network switch to the non-volatile memory components of the cold data pool device based on a second predetermined time or time interval; and
in response to determining that an amount of data stored in the non-volatile memory components of the cold data pool device exceeds a second predetermined threshold:
removing the cold data pool device from a physical rack associated with the distributed storage system; and
inserting a new cold data pool device to the physical rack associated with the distributed storage system.

11. A first network switch, comprising:
a processor;
a plurality of ports;
a storage component;
a first integrated circuit configured to:
receive data to be written to the storage component; and
write the data to the storage component; and a second integrated circuit configured to:
perform a data reduction process which reduces a size of the data to obtain reduced data, wherein performing the data reduction process comprises:
transcoding the data responsive to determining that a video format associated with the data is supported by the first network switch;
compressing the data;
calculating a hash value of the compressed data;
performing a de-duplication process responsive to determining, based on the calculated hash value, that a data block corresponding to the compressed data exists in non-volatile memory of one or more storage devices; and
obtaining the reduced data; and
encode the reduced data based on an erasure code (EC) to obtain EC-encoded data, wherein the encoded data is written to the non-volatile memory of the one or more storage devices.

12. The network switch of claim 11, wherein in performing the data reduction process, the second integrated circuit is further configured to:
determine that the video format associated with the data is supported by the first network switch.

13. The network switch of claim 11, wherein the second integrated circuit is further configured to:
in response to determining, based on the calculated hash value, that a data block corresponding to the compressed data does not exist in the non-volatile memory of the storage devices:
mark the data block and storing a mapping of the data block to a new key.

14. The network switch of claim 11,
wherein in response to determining, based on the calculated hash value, that the data block corresponding to the compressed data exists in the non-volatile memory of the storage devices, the second intergrated circuit is further configured to:
perform the de-duplication process by discarding the data block and storing a mapping of the data block to metadata associated with the data block.

15. The network switch of claim 11, wherein the EC-encoded data comprises an EC codeword.

16. The network switch of claim 15,
wherein the second integrated circuit is further configured to divide the EC codeword into a plurality of parts, and
wherein the first integrated circuit is further configured to transmit the EC-encoded data as the plurality of parts to a set of the one or more storage devices to be written to non-volatile memory of the set of the one or more storage devices.

17. The network switch of claim 16, wherein the first integrated circuit transmitting the EC-encoded data as the plurality of parts to the set of the one or more storage devices causes a respective storage device of the set to:
receive a first part of the divided EC codeword to be written to the non-volatile memory of the respective storage device; and
write the first part of the divided EC codeword to the non-volatile memory of the respective storage device.

18. The network switch of claim 11, wherein the data to be written to the storage component of the first network switch comprises first data, and wherein a second network switch is configured to:
receive second data to be written to a storage component of the second network switch, wherein the second data is the same as the first data, and wherein the second network switch provides high availability for the first network switch; and wherein the second integrated circuit performing the data reduction process and encoding the reduced data are in response to determining that the first data is successfully written to the storage component of the first network switch and that the second data is successfully written to the storage component of the second network switch.

19. The network switch of claim 18, wherein a distributed storage system comprises the first network switch, the second network switch, the one or more storage devices, a plurality of compute nodes, and a cold data pool device, wherein the cold data pool device comprises multiple non-volatile memory components, and wherein the second network switch comprises: the storage component of the second network switch; and a second integrated circuit residing on the second network switch, wherein the second integrated circuit of the second network switch performs similar operations as the second integrated circuit of the first network switch.

20. The network switch of claim 19, wherein the one or more storage devices are configured to identify, in the one or more storage devices, cold data which has been accessed less than a first predetermined threshold, wherein a respective storage device is configured to transfer the cold data from the respective storage device to the first or second network switch based on a first predetermined time or time interval;

wherein the first integrated circuit of the first or second network switch is further configured to transfer the cold data from the first or second network switch to the non-volatile memory components of the cold data pool device based on a second predetermined time or time interval; and wherein the cold data pool device is configured to, in response to determining that an amount of data stored in the non-volatile memory components of the cold data pool device exceeds a second predetermined threshold cause a user to:
  remove the cold data pool device from a physical rack associated with the distributed storage system; and
  insert a new cold data pool device to the physical rack associated with the distributed storage system.

21. A computer system, comprising:
one or more storage devices;
a cold data pool device; and
a first network switch and a second network switch,
wherein a network switch comprises: a processor; a plurality of ports; a storage component; a first integrated circuit; and a second integrated circuit,
wherein the first integrated circuit is configured to:
  receive data to be written to the storage component; and
  write the data to the storage component; and
wherein the second integrated circuit is configured to:
  perform a data reduction process which reduces a size of the data to obtain reduced data, wherein performing the data reduction process comprises:
    transcoding the data responsive to determining that a video format associated with the data is supported by the first network switch;
    compressing the data;
    calculating a hash value of the compressed data;
    performing a de-duplication process responsive to determining, based on the calculated hash value, that a data block corresponding to the compressed data exists in non-volatile memory of one or more storage devices; and
  encode the reduced data based on an erasure code (EC) to obtain EC-encoded data.

\* \* \* \* \*

UNITED STATES PATENT AND TRADEMARK OFFICE
CERTIFICATE OF CORRECTION

PATENT NO. : 11,137,923 B2
APPLICATION NO. : 16/515549
DATED : October 5, 2021
INVENTOR(S) : Shu Li It is certified that error appears in the above-identified patent and that said Letters Patent is hereby corrected as shown below:

On the Title Page

Item (54) and in the Specification Column 1 Line 4 Title: "RATION" should read "RATIO"

In the Claims

Claim 1, Column 14, Line 28 "intergrated" should read "integrated"
       Column 14, Line 35 "process comprises;" should read "process comprises:"
Claim 14, Column 16, Line 38 "intergrated" should read "integrated"
Claim 21, Column 18, Line 34-36 "storage devices; and encode the reduced data based on an erasure code (EC) to obtain EC-encoded data." should read "storage devices; and obtaining the reduced data; and encode the reduced data based on an erasure code (EC) to obtain EC-encoded data"

Signed and Sealed this
Seventeenth Day of May, 2022

Katherine Kelly Vidal
*Director of the United States Patent and Trademark Office*